Feb. 29, 1944.   B. C. PLACE   2,342,690
SHEET METAL NUT
Filed March 8, 1939   2 Sheets-Sheet 1
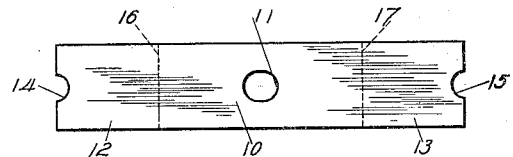
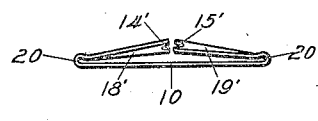
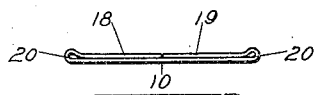
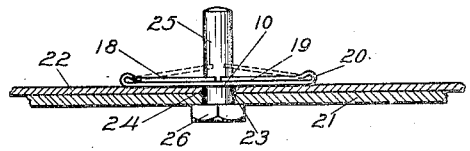
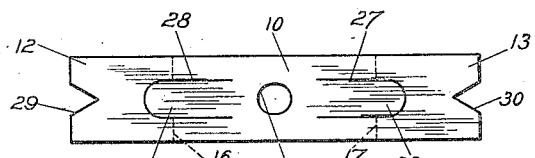
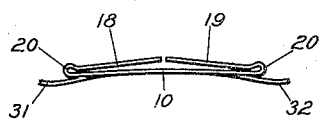
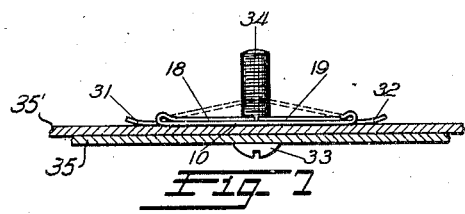
Inventor
Bion C. Place
By Strauch & Hoffman
Attorneys Feb. 29, 1944.  B. C. PLACE  2,342,690
SHEET METAL NUT
Filed March 8, 1939   2 Sheets-Sheet 2
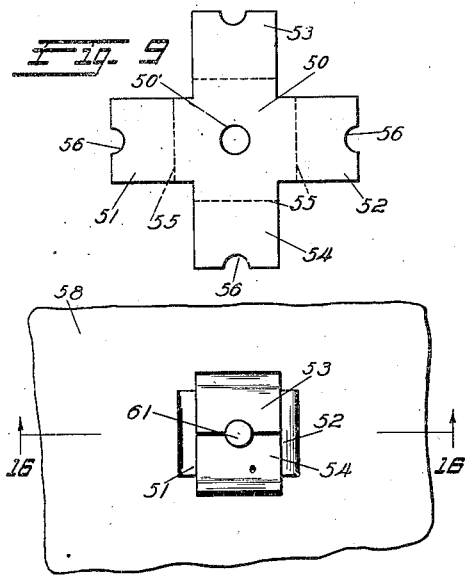
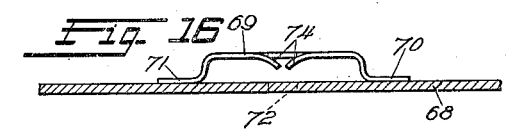
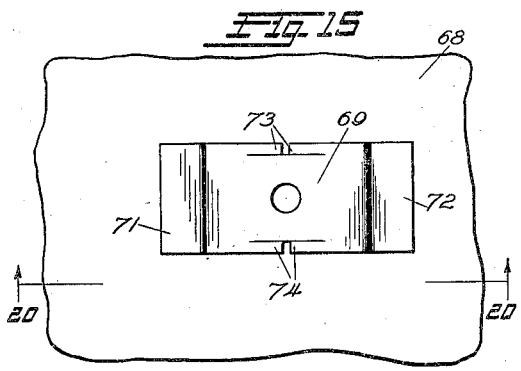
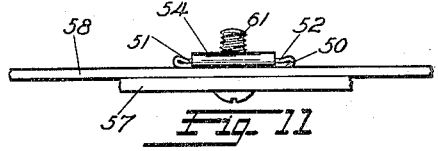
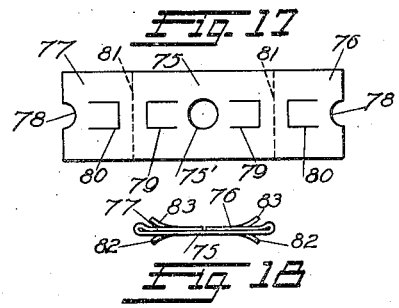
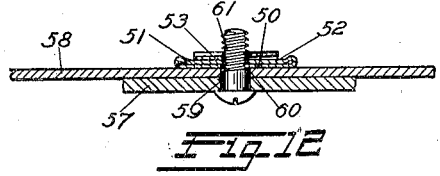
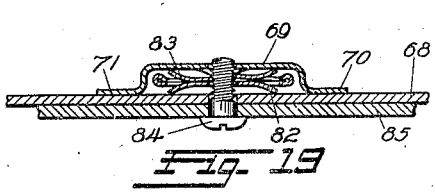
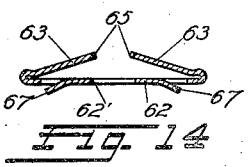
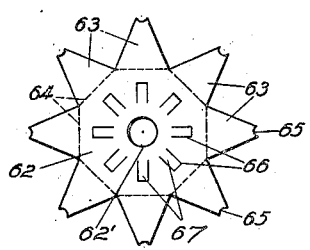
Inventor
Bion C. Place
By Strauch & Hoffman
Attorneys Patented Feb. 29, 1944

2,342,690

UNITED STATES PATENT OFFICE 2,342,690

SHEET METAL NUT

Bion C. Place, Detroit, Mich., assignor of one-half to George E. Gagnier, Detroit, Mich.

Application March 8, 1939, Serial No. 260,596

6 Claims. (Cl. 85—36)

The present invention pertains to a sheet metal nut or the like intended to be applied to a threaded or smooth shank of a bolt or stud with great facility. More particularly, the present invention contemplates a sheet metal nut that can be applied to the shank of a bolt or stud by a translatory motion along the length of the shank, and which then can be fixidly secured at the proper point along the length of the shank by forcing arms formed as a part of the nut into biting or like engagement with said shank.

Sheet metal nuts, designed so that they can be applied to the shank of a bolt by a translatory motion along the length of the bolt without turning the bolt except in the operation of drawing the nut tight, as heretofore proposed have the serious drawback in that the strength of the nuts and consequently their holding power is very limited. Furthermore, in sheet metal spring nut structures as heretofore proposed, the tenacity with which the nut can be caused to engage the shank of the bolt is not great because the resistance of the nut structure to bending of parts thereof when the nut is drawn tight is quite small.

The primary purpose of the present invention is to provide an improved spring sheet metal nut capable of application to a threaded or unthreaded shank of a stud or bolt with the facility characterizing the more flimsy constructions heretofore proposed, but so constructed that it possesses many times the strength of nuts as heretofore used, even when constructed of the same gauge material, the added strength of the nut being contributed by the mode of forming the nut structure.

A further object of the invention is to provide an improved sheet metal nut constructed of a strip of metal material of uniform width from end to end, and in which the bolt or stud engaging arms are formed by return-bending portions of said strip over the body thereof so that each arm possesses the rigidity and strength of the strip itself from which the nut is fabricated.

A still further object of the invention is to provide an improved spring sheet metal nut comprising a body portion which is provided with an aperture to fit the shank of the bolt or stud, and to thus center the nut on said shank, and a pair of spring arms extending inwardly from opposite sides of the body portion with their ends in proximity over said aperture, the ends of the arms being provided with matching notches of a diameter substantially smaller than the diameter of said aperture so that when the nut is applied to the shank of the bolt or stud the arms are caused to assume a substantial acute angular relationship with respect to the body portion so as to position said arms for subsequent movement toward the body portion and toward a position parallel to the body portion at which the maximum holding or gripping effect on the shank of the bolt or stud is obtained.

A still further object of the invention is to provide an improved spring sheet metal nut provided with means, separate from the arms which engage the shank of the stud or bolt, to resiliently contact the supporting or supported structure so as to exert a yielding pressure upon said structure taking up all looseness in the connection made by the stud or bolt after the nut has been properly positioned with respect to said stud or bolt.

A further object of the invention is to provide a sheet metal nut having means to engage adjacent convolutions of the thread of a bolt shank, or to engage spaced portions of an unthreaded shank, consisting in two pairs of arms disposed with their ends in different planes, the ends being notched for cooperation with the shank of the bolt or stud.

This invention also aims to provide an improved mode of non-rotatively retaining the nut of the present invention in position on a structure to receive a bolt, when the nut is inaccessible for application to an adjustment on the bolt.

Still another object of this invention is to provide a nut having a multiplicity of arms overlying a body and extending toward a perforation in the body, the ends of the arms being formed to each bitingly engage the shank of the bolt or stud with which the nut is engaged when the arms have been caused to assume their final or holding position.

Still further objects of the invention will appear as the discription thereof proceeds with reference to the accompanying drawings in which:

Figure 1 is a plan view of a preferred form of blank from which a nut constructed in accordance with the present invention may be found;

Figure 2 shows the preferred form of nut as bent from the blank illustrated in Figure 1;

Figure 3 is a plan view of the nut appearing in Figure 2;

Figure 4 is a sectional view showing the application of the nut of Figures 2 and 3 to an unthreaded bolt and illustrating one manner in which said nut may be used in securing a supporting and supported structure together;

Figure 5 is a plan view of a modified form of blank from which a different type of nut including the present invention may be formed;

Figure 6 is a side view of the nut bent from the blank of Figure 5;

Figure 7 is a fragmentary sectional view showing the mode of use of the nut of Figure 6 in securing several structures together in cooperation with a thread screw;

Figure 8 is a side elevational view of a modified form of spring nut which may be formed from a blank similar to that illustrated in Figure 1.

Figure 9 is a plan view of a blank of a further modified form of sheet metal nut including the present invention;

Figure 10 is a fragmentary plan view showing a nut made from such a blank as is illustrated in Figure 9 in position on a bolt retaining a supported and supporting structure in engagement with each other;

Figure 11 is an edge elevation of the parts illustrated in Figure 10;

Figure 12 is a sectional view taken on the plane indicated by the line 18—18 in Figure 10 looking in the direction of the arrows;

Figure 13 is a plan view of a blank of a still further modified form of sheet metal nut including the present invention;

Figure 14 is a transverse sectional view of a nut constructed from the blank illustrated in Figure 13;

Figure 15 is a fragmentary plan view of a structure having a nut retainer of a type preferred when nuts of the present invention are used in positions in which the nut is not accessible for adaptation to the shank of the stud or bolt;

Figure 16 is a sectional view taken on the plane indicated by the line 20—20 in Figure 15 looking in the direction of the arrows;

Figure 17 is a plan view of a further modified form of blank from which a preferred form of nut for use in connection with structures such as illustrated in Figures 15 and 16 may be made;

Figure 18 is an edge view of a nut formed from the blank illustrated in Figure 17; and Figure 19 is a fragmentary sectional view showing how the nut of Figure 18 is used in connection with a structure of the type illustrated in Figures 15 and 16.

Like reference characters indicate like parts throughout the several figures.

A preferred form of sheet metal spring nut is formed from the blank illustrated in Figure 1 which blank comprises a body portion 10 having an aperture 11 therein. The aperture 11 corresponds in size and cross-sectional form to the shank of a bolt or stud with which the nut is intended to be used. The blank includes also end portions 12 and 13 projecting in opposite directions from the body 10. The end portion 12 has a notch 14 formed therein while the end portion 13 has a similar notch 15.

In order to form a preferred nut of the present invention, the end portions 12 and 13 are bent so as to overlie the body 10 on the dotted lines 16 and 17 of Figure 1, resulting in the completed nut illustrated in Figures 2 and 3, the end portions 12 and 13, after being bent so as to overlie the body 10, forming arms 18 and 19 of the same width as the body of the strip. Preferably in bending the rams 18 and 19 to overlie the body a rounded bead 20 is provided at each line of bend, sharp lines of bend being avoided to prevent a weakening of the nut at said lines in the process of bending the arms so as to overlie the body.

In its completed form, the free ends of the arms 18 and 19 are closely adjacent and the notches 14 and 15 match, and together define an opening of materially less size than the aperture 11 in the body 10, as clearly illustrated in Figure 3. The arms 18 and 19 may be bent so that they are disposed parallel to the body 10 as illustrated in Figure 2, or they may assume a slight acute angle with respect to said body if desired.

The mode of use of the nut just described is made clear from Figure 4 of the drawings in which structures 21 and 22 provided with aligned openings 23 and 24 for the passage of the shank 25 of a bolt or stud having a head 26 is utilized to secure the structures 21 and 22 together by passing said shank through the aligned apertures therein. After said shank has been passed through said apertures the sheet metal nut of Figures 2 and 3 is applied to the shank 25 by passing said shank through the aperture 11 in the body 10 and through the opening provided by the matched recesses 14 and 15. This is accomplished by simply moving the nut in a straight line along the length of the shank which may be unthreaded or relatively smooth. Inasmuch as the size of the aperture 11 corresponds to the cross-section of the shank 25, said shank passes freely through said opening. However, since the size of the opening provided by the matched recesses 14 and 15 is materially less than the cross-sectional size of said shank, in moving the nut along the length of the shank the arms 18 and 19 are caused to assume the dotted line position illustrated in Figure 4, the arms, in swinging to this position, providing an enlarged opening to permit the nut to be freely assembled on the shank and brought into contact with the surface of the structure 22.

After the blank of Figure 1 has been bent into the form of Figures 2 and 3, the resultant nut is properly tempered, and when it has been assembled on the shank 25 as just described, and the arms 18 and 19 moved to the dotted line position of Figure 4 it will be understood that the bending of said arms in opposition to their inherent tendency to remain parallel to the body 10 causes the ends of said arms to firmly engage the shank 25 when said arms are in said position. In order, however, to vastly increase the tenacity of the engagement of said arms with the shank 25, a suitable tool may be applied over the shank 25 to force the arms toward their original position or in approximate parallelism to the body 10. The forcing of the arms 18 and 19 to the position illustrated in full lines in Figure 4, causes the walls of the notches therein to engage the shank with a biting action.

Inasmuch as the arms 18 and 19 are constructed of the full width of the strip from which the nut is made, it will be understood that said arms possess great resistance to bending transversely of their length, and, accordingly, in the operation of moving said arms toward the body, said arms are caused to exert relatively great pressure to the shank of the stud, thus securing a firm non-rotative connection between said shank and the nut. The arms 18 and 19 may be moved toward the body 10 until they are parallel to said body or until they are almost parallel thereto. During this operation the nut is properly held centered on the stud because of the fact that the shank of the stud fits in the aperture 11 of the body 10. Furthermore, the arms 18 and 19 can only be moved parallel to the body 10 because said body acts as a stop limiting the movement of said arms along the shank in the direction of said body.

After the arms have been moved in parallelism to the body, or in approximate parallelism thereto, a connection of great strength is provided between the nut and the shank, said connection being capable of withstanding substantial forces tending to separate the structures 21 and 22 or to move the bolt bodily along the shank 25. However, if it should be desired to release the connection, it is possible to do so by prying the arms 18 and 19 away from the body to cause them again to assume the dotted line position of Figure 4 when the nut can be removed and disassembly effected.

If desired, the nut already described may be constructed in the modified manner illustrated in Figure 3A in which the arms 18' and 19' are inclined from side to side in opposite directions as illustrated when the nut is constructed in this manner and assembled on an unthreaded shank in the manner illustrated in Figure 4, the notches 14' and 15' in the ends thereof engage said shank on inclined planes and when said arms are firmly forced into contact with the shank of the stud, which is soft compared to the tempered nut, and thus caused to bite therein, the arms may be drawn toward a position parallel to the body of the nut by turning the stud as by applying a wrench to the head 26 thereof. In turning said stud the ends of the arms cut shallow threads in the shank of the stud as the stud is turned and as said arms progressively form portions of a thread as they are moved downward to a position approximately parallel to the body 10. It will thus be seen that in this form of the invention, the locking of the nut to the shank of the bolt may be accomplished by a turning thereof after the nut has been translated to approximately its final position.

A modified form of blank from which a nut including the present invention may be made is illustrated in Figure 5 in which the body 10 is provided with a pair of U-shaped incisions 27 and 28 on opposite sides of the aperture 11. The end portions 12 and 13 are provided with V-shape notches 29 and 30. In other respects the blank of Figure 5 is like that of Figure 1 and the same reference characters indicate the same parts therein.

In forming a modified form of nut from the blank of Figure 5, the end portions 12 and 13 are bent so as to overlie the body 10 as in the form of the invention first described. The tongues 31 and 32 provided by the U-shaped incisions 27 and 28 are bent out of the plane of the body 10 in the manner illustrated in Figure 6. After the nut has been bent into this form it is properly tempered and it is then ready to be used in the manner already described.

Figure 7 shows the form of nut illustrated in Figure 6 applied to a bolt having a head 33 and a threaded shank 34, the threaded shank 34 being passed through aligned openings in structures 35 and 35'. The nut is applied to the threaded shank by passing said shank through the aperture 11 in the body and between the matching notches 29 and 30. The notches 29 and 30, as in the form of the invention first described, define an opening between them of materially less size than the shank of the bolt so that in applying the nut to the shank of the bolt the arms 18 and 19 are first caused to assume the dotted line position illustrated in Figure 7.

A bolt is selected having a threaded shank having a pitch preferably exceeding the thickness of the metal from which the nut is constructed so that the ends of the arms will be engaged within the helical groove in the shank of the bolt. Application of the nut is completed by turning the bolt through several revolutions, such turning serving to move the arms toward a position parallel to or approximately parallel to the body of the nut.

In the final position of the nut, said arms very firmly engage the shank of the bolt at the same time that the arms are moved toward a position parallel to or approximately parallel to the body 10. The tongues 31 and 32 are moved toward their original position in the plane of the body 10 so that the nut exerts a pressure against the structure 35' which may be increased as the bolt is turned. In this way the nut exerts a resilient pressure against the structure 35' taking up all possible looseness between the nut and the structures secured together thereby.

It will be understood that while an unthreaded stud has been illustrated in connection with the use of the nut illustrated in Figures 2 and 3 and that a threaded stud has been illustrated in connection with the use of the nut of Figure 6, either nut can be used with a threaded or an unthreaded shank, an unthreaded shank being illustrated in one instance and a threaded shank in the other merely to illustrate the adaptability of the nut of the present invention to either a threaded or an unthreaded bolt or stud. When the nut of the present invention is used with an unthreaded shank it becomes analogous to the head of a rivet and the connection made has many of the characteristics of a riveted connection.

In the modified form of blank illustrated in Figure 9, a body 50 having a perforation 50' therein, is provided with one pair of arms 51 and 52 projecting from opposite sides of the body, and a second pair of arms 53 and 54 projecting from other opposite sides of said body. The nut is formed by first bending the arms 51 and 52 inwardly over the body 50 on the dotted lines 55. Then the second pair of arms 53 and 54 are likewise bent inwardly over the body so as to overlie the arms 51 and 52. Notches 56 are formed in the ends of each of said arms, the size of said notches being related to the size of the perforation 50' in the manner already described.

The nut formed from the blank illustrated in Figure 9 is used in the manner illustrated in Figures 10, 11 and 12 in which 57 designates a supporting structure and 58 a supported structure overlying the supporting structure. Structure 57 is provided with an opening 59 which registers with an opening 60 in the structure 58. A headed bolt 61 is passed through the aligned openings 59 and 60 and the nut is then applied to the shank thereof. As the nut is applied to the shank of the bolt 61 the arms 51 and 52 as well as the arms 53 and 54 are moved away from the body 50 to permit said shank to pass through the smaller openings provided between the matching recesses 56 in the respective ends of the pairs of arms. Pressure is then exerted on the arms causing them to be moved toward the body 50 and, if desired, the bolt can be turned to cause said arms to move toward said body. As the arms are moved toward the body the ends thereof are brought into biting engagement with the shank of the bolt, the arms 51 and 52 engaging one groove of said bolt, while the arms 53 and 54 preferably engage the next or adjacent groove between the threads. It will be understood that in this form of the invention the nut engages several threads of the bolt.

Figure 13 illustrates a further modified form of blank comprising a body 62 having a perforation 62' centrally thereof. Projecting radially from the body are a multiplicity of arms 63. While eight of said arms have been illustrated in this figure it will be understood that any greater or lesser number of arms may be provided.

To form the nut from the blank illustrated in Figure 13 the arms 63 are bent so as to overlie the body on the dotted lines 64. Notches 65 are formed in the end of each of said arms. After the arms 63 are bent inwardly an opening is provided between the ends which is of a less size than the opening 62' so that it is necessary in engaging the bolt with the nut to move said arms away from the body. To bring about an engagement between the nut and the bolt the arms are moved toward the body of the nut, either by turning the body or by exerting pressure against the arms forcibly moving them toward the body. Preferably the notches 65 are so formed that the opening provided by the various notches is jagged in form. This may be accomplished by forming the notches so that the walls thereof do not follow the contour of the portion of the bolt with which the ends of the arm engage so that the end of each arm presents two spaced teethlike projections which bite into the shank of the bolt or stud.

If desired, the body 62 of the nut may be provided with a multiplicity of U-shaped incisions 66 separating tongues 67 from said body. Said tongues may be bent away from the body in a direction opposite to that of the arms 63 as illustrated in Figure 14, said tongues serving a purpose similar to the tongues 31 and 32 of Figure 6 already described.

Figures 15 and 16 illustrate a preferred arrangement for securing sheet metal nuts of the present invention to a supporting or supported structure when the nut is not accessible for manipulation in applying it to the shank of the bolt or stud necessitating the engagement of the bolt with the nut by a manipulation of the bolt alone. In these figures, 68 designates the structure. A strip of metal 69 having offset ends 70 and 71 welded or otherwise secured to the body of the structure 68 over an opening 72 therein through which the shank of the bolt is passed in engaging the nut as hereinafter described. The body of the strip 69 is provided with incisions in its edges separating a pair of tongues 73 from one edge of said body and a second pair of tongues 74 from the other edge of said body. The tongues 73 and 74 are bent downwardly as indicated in Figure 20 and provide stops to retain the nut beneath the body 69 after it has been inserted between said body and the structure 68 in the manner presently to be described.

While it will be understood that sheet metal nuts of various kinds may be used in connection with such a structure as is illustrated in Figures 15 and 16, the sheet metal nut illustrated in Figures 17 and 18 is preferred. Referring to the latter figures, the nut comprises a body 75 having a perforation 75' therein for the passage of the threaded shank or bolt. Arms 76 and 77 project from opposite ends of the body provided with matching notches or recesses 78 in the ends thereof for the purpose already described. The body 75 is provided with a pair of U-shaped incisions 79 and the tongues 76 and 77 are likewise provided with a pair of similar incisions 80.

The nut of Figure 18 is formed from the blank of Figure 17 by bending the arms 76 and 77 inwardly over the body 75 on the dotted lines 81 and by bending the tongues separated by the incisions 79 from the body downwardly as indicated at 82. The tongues separated by the incisions 80 are bent upwardly away from the arms 76 and 77 as indicated at 83.

The nut of Figure 18 is shown assembled with the structure of Figures 15 and 16 in Figure 19. To apply the nut to the structure 68 pressure is exerted against the nut so as to compress the resilient tongues 82 and 83 toward the planes of the body and arms respectively. The nut may then be passed beneath the body 69 from either side thereof beneath either of the stops 73 or 74. When the nut is disposed centrally beneath the body 69, and the pressure tending to flatten the tongues 82 and 83 released, the body of the nut will center itself between the strip 69 and the structure 68. In this position the nut is resiliently supported between the structure 68 and the strip 69, and is in position to engage the shank of a bolt 84 passed through an opening in a supporting structure 85, in register with the opening in the structure 68. In order to bring about engagement between the shank of the bolt 84 and the nut it is only necessary to turn the bolt through the nut, the resilient mounting of said nut permitting the ready engagement of the threads of the bolt with the edges of the arms 76 and 77. Said arms, as in the invention first described are first moved away from the body of the bolt when the shank of the bolt is passed through the nut, and, subsequently, after engagement of the ends of said arms with the thread and said bolt is rotated, said arms are drawn to the body 75 causing a very firm engagement between the bolt shank and said arms. The tongues 82 and 83 will yield more or less depending upon the final position of the nut on the shank of the bolt. All looseness between the nut and the strip that holds it assembled to the structure 69 is thus avoided.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description.

What is claimed and desired to be secured by United States Letters Patent is:

1. A sheet metal nut or the like, comprising an elongated body having a perforation corresponding in shape and size to the cross section of the shank of a stud or bolt, and a pair of relatively long arms respectively overlying opposite ends of said body, said arms having matching notches therein having a small depth compared to the length of one of said arms, the walls of said notches together defining a fastener engaging aperture of smaller size than said perforation.

2. A sheet metal nut or the like, comprising an elongated strip of metal of uniform width having opposite ends thereof return-bent by rounded bend so as to provide relately long movable arms overlying said body, and having their ends closely adjacent each other, a perforation in said strip beneath said arm ends and shallow matching notches in said ends, the walls of said notches together defining a fastener engaging aperture of smaller size than said perforation.

3. A sheet metal nut or the like, comprising a strip of metal having relatively long portions thereof turned inwardly over the body to provide arms in approximate parallelism to said body and terminating in close proximity, and fastener engaging means formed in said body and arms to permit the shank of a bolt or stud to be passed through the body and to cause said arms to move substantially until they assume acute angular positions with respect to said body, whereby said shank will be strongly gripped when said arms are caused to move toward said body.

4. A sheet metal nut having a body having an aperture in which the shank of a bolt or stud fits, said body having tongues struck therefrom and bent out of the plane thereof to resiliently support the nut upon the structure it engages, and a pair of relatively long arms bent inwardly from opposite sides of said body so as to overlie the body in approximate parallelism thereto, said arms terminating closely adjacent to each other and having shallow notches cut therein from the ends thereof so as to define a fastener engaging aperture and provide a passage for said shank materially smaller in size than said aperture, whereby when said shank is engaged with the nut said arms are caused to assume acute angles with said body.

5. A sheet metal nut or the like, comprising an elongated body having a perforation for the free passage of a bolt or stud, a pair of relatively long arms return-bent inwardly from opposite sides of said body in approximate parallelism to said body and having their ends disposed in proximity over said perforation, a second pair of relatively long arms return-bent inwardly in like manner from other opposite sides of said body and overlying at their ends the ends of said first-named arms, and fastener engaging means formed in the ends of all of said arms to bitingly engage portions of said bolt or stud when said nut is engaged therewith.

6. A sheet metal nut or the like, including an elongated body having relatively long portions thereof return-bent so as to provide a multiplicity of arms overlying said body in approximate parallelism thereto and terminating in close proximity to each other, said body being perforated to the extent necessary to just pass the shank of a bolt or stud through the body and said arms being notched to jointly present a fastener engaging aperture between the adjacent ends of said arms having a cross-sectional area materially less than the area of the perforation for said shank.

BION C. PLACE.